(12) United States Patent
Porras et al.

(10) Patent No.: US 10,293,658 B2
(45) Date of Patent: *May 21, 2019

(54) TRACTION BATTERY COOLING SYSTEM FOR AN ELECTRIFIED VEHICLE

(71) Applicant: FORD GLOBAL TECHNOLOGIES, LLC, Dearborn, MI (US)

(72) Inventors: Angel Fernando Porras, Dearborn, MI (US); Timothy Noah Blatchley, Dearborn, MI (US); Mark G. Smith, Canton, MI (US); Brett Allen Dunn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/142,914

(22) Filed: Apr. 29, 2016

(65) Prior Publication Data

US 2017/0313158 A1 Nov. 2, 2017

(51) Int. Cl.
*H01M 6/50* (2006.01)
*B60H 1/00* (2006.01)
*H01M 10/613* (2014.01)
*H01M 10/625* (2014.01)
*H01M 10/63* (2014.01)
(Continued)

(52) U.S. Cl.
CPC ..... *B60H 1/00892* (2013.01); *B60H 1/00278* (2013.01); *B60H 1/00392* (2013.01); *B60H 1/00828* (2013.01); *B60H 1/00885* (2013.01); *H01M 10/613* (2015.04); *H01M 10/625* (2015.04); *H01M 10/63* (2015.04); *H01M 10/6556* (2015.04); *H01M 10/6568* (2015.04); *H01M 10/663* (2015.04); *B60H 2001/00307* (2013.01); *B60H 2001/00928* (2013.01); *B60H 2001/00949* (2013.01); *B60H 2001/3241* (2013.01); *B60H 2001/3251* (2013.01); *B60H 2001/3255* (2013.01);
(Continued)

(58) Field of Classification Search
CPC .......................... H01M 10/00; B60H 1/00892
See application file for complete search history.

(56) References Cited

U.S. PATENT DOCUMENTS 6,138,466 A 10/2000 Lake et al.
7,918,296 B2 4/2011 Reddy
(Continued)

FOREIGN PATENT DOCUMENTS

JP 2012114030 A 6/2012
WO 2012016885 A1 2/2012

OTHER PUBLICATIONS

English Machine Translation of JP2012114030A.
(Continued)

*Primary Examiner* — Abdullah A Riyami
*Assistant Examiner* — Nader J Alhawamdeh
(74) *Attorney, Agent, or Firm* — Vichit Chea; David Kelley; King & Schickli, PLLC (57) ABSTRACT

A cooling system is provided for a traction battery of an electrified motor vehicle. That cooling system includes a cooling circuit, a refrigerant circuit, a plurality of flow control valves and a control system. That control system includes a controller configured to (a) control operation of the plurality of flow control valves and (b) prioritize cabin cooling over traction battery cooling.

20 Claims, 6 Drawing Sheets

(51) Int. Cl.
*H01M 10/6556* (2014.01)
*H01M 10/663* (2014.01)
*H01M 10/6568* (2014.01)
H01M 10/6567 (2014.01)
B60H 1/32 (2006.01)

(52) U.S. Cl.
CPC ............... *B60H 2001/3272* (2013.01); *B60H 2001/3285* (2013.01); *H01M 10/6567* (2015.04); *H01M 2220/20* (2013.01)

(56) References Cited

U.S. PATENT DOCUMENTS

| | | | |
|---|---|---|---|
| 7,971,447 B2 | 7/2011 | Maitre | |
| 8,448,460 B2 | 5/2013 | Dogariu et al. | |
| 8,620,506 B2 | 12/2013 | Kummer et al. | |
| 8,741,465 B2 | 6/2014 | Nagata et al. | |
| 8,753,762 B2 | 6/2014 | Major et al. | |
| 2009/0249807 A1 | 10/2009 | Nemesh et al. | |
| 2012/0297809 A1* | 11/2012 | Carpenter | B60L 1/003 62/244 |
| 2013/0022888 A1* | 1/2013 | Vollmer | H01M 8/04007 429/434 |
| 2013/0280564 A1* | 10/2013 | Zheng | B60L 11/1874 429/62 |
| 2014/0020415 A1* | 1/2014 | Heyl | F25B 13/00 62/119 |
| 2014/0070013 A1 | 3/2014 | Stanek et al. | |
| 2015/0013367 A1* | 1/2015 | Carpenter | B60H 1/00278 62/222 |
| 2015/0202986 A1* | 7/2015 | Hatakeyama | B60L 3/00 165/287 |
| 2017/0313158 A1* | 11/2017 | Porras | H01M 10/6568 |
| 2017/0317393 A1* | 11/2017 | Blatchley | H01M 10/625 |

OTHER PUBLICATIONS

English Machine Translation of WO2012016885A1.
"Sustainability and Environment Protection E-Car"; Sanhua Europe; https://www.sanhuaeurope.com/en/about-us/sustainability-and-enviromental-policies; printed Nov. 13, 2015; pp. 1-6.

* cited by examiner

Load = Funct(AirTemp, BlowerSpeed)

| Blower Speed (%) | Ambient Air Temperature (DegC) | | | | | | | |
|---|---|---|---|---|---|---|---|---|
| | 10 | 15 | 20 | 25 | 30 | 35 | 40 | 45 |
| 0 | 0 | 0 | 10 | 20 | 25 | 30 | 40 | 45 |
| 10 | 0 | 10 | 10 | 20 | 25 | 30 | 40 | 45 |
| 20 | 10 | 10 | 15 | 20 | 30 | 35 | 40 | 50 |
| 30 | 15 | 20 | 25 | 30 | 35 | 40 | 50 | 55 |
| 40 | 25 | 20 | 30 | 40 | 50 | 55 | 60 | 65 |
| 50 | 20 | 30 | 40 | 45 | 50 | 55 | 60 | 65 |
| 60 | 30 | 30 | 40 | 50 | 60 | 65 | 70 | 75 |
| 70 | 30 | 40 | 50 | 60 | 65 | 75 | 70 | 80 |
| 80 | 35 | 40 | 50 | 60 | 70 | 80 | 70 | 90 |
| 90 | 40 | 50 | 60 | 70 | 80 | 90 | 95 | 100 |
| 100 | 45 | 50 | 60 | 70 | 80 | 90 | 100 | 100 |

TRACTION BATTERY COOLING SYSTEM FOR AN ELECTRIFIED VEHICLE

TECHNICAL FIELD

This document relates generally to the motor vehicle equipment field and, more particularly, to a traction battery cooling system for an electrified motor vehicle. That cooling system may incorporate an electronic expansion valve and a refrigerant-to-coolant heat exchanger chiller.

BACKGROUND

Hybrid electric vehicles and electric vehicles use an electric motor to propel the vehicle. The power is supplied to that electric motor by a traction battery. The traction battery is configured to store an electrical charge and may also be used to power other vehicle components. Efficient use of the traction battery may significantly extend the range of the motor vehicle. Since the battery power availability is affected by battery temperature, hybrid and electric vehicles may include a liquid cooling system for the traction battery. Many such systems incorporate a refrigerant-to-coolant chiller that is coupled to the vehicle cabin's air conditioning (HVAC) system. As a result, utilization of the chiller to provide traction battery cooling may lead to temperature swings of the conditioned air being discharged into the motor vehicle cabin. Such swings in temperature may be noticeable by the vehicle occupants and, therefore, are not desired.

This document relates to a new and improved traction battery cooling system and controls for an electrified motor vehicle that limits or substantially eliminates these temperature swings under normal operating conditions thereby increasing vehicle occupant comfort and satisfaction.

SUMMARY

In accordance with the purposes and benefits described herein, a traction battery cooling system is provided for an electrified motor vehicle. That cooling system comprises a coolant circuit, a refrigerant circuit, a plurality of flow control valves and a control system.

The coolant circuit circulates coolant between the traction battery and either a battery radiator and/or a chiller. The refrigerant circuit circulates refrigerant between a compressor, a condenser and either a first cabin evaporator and/or the chiller. The plurality of flow control valves are provided in both the coolant circuit and the refrigerant circuit. The control system includes a controller that is configured to (a) control operation of the plurality of flow control valves and (b) manage AC capacity by prioritizing cabin or battery cooling under normal vehicle operating conditions. Advantageously, the cooling system functions to delay using the chiller for battery cooling until the HVAC load for the motor vehicle cabin has been decreased to the point where there may be excess refrigerant evaporative capacity, thereby reducing or substantially eliminating undesired swings in the conditioned air being discharged by the HVAC system into the motor vehicle cabin.

In some embodiments, the plurality of flow control valves includes an electronic expansion valve that is provided in the refrigerant circuit between the condenser and the chiller.

In some possible embodiments, the controller is configured to include a first data input for ambient air temperature. Further, the controller is configured to include a second data input for HVAC blower speed. In addition, the controller is configured to include a third data input for evaporator temperature. In addition, the control system may further include an ambient temperature sensor and an evaporator temperature sensor that are connected, respectively, to the first and third data inputs.

In some possible embodiments the controller is also configured to include a fourth data input for refrigerant temperature between the chiller and the compressor and a fifth data input for refrigerant pressure between the chiller and the compressor. Further, the control system may include a refrigerant temperature sensor and a refrigerant pressure sensor in the refrigerant circuit between the chiller and the compressor. In still other embodiments, the refrigerant circuit may include a second evaporator provided in parallel to the first evaporator and chiller. For example, a minivan may include a front evaporator and a rear evaporator.

In accordance with an additional aspect, a method is provided of controlling traction battery cooling while limiting temperature swings of the conditioned air discharged into a cabin of an electrified motor vehicle. That method comprises the steps of (a) monitoring, by a first device, ambient air temperature, (b) monitoring, by a second device, HVAC blower speed, (c) monitoring, by a third device, evaporator temperature and (d) prioritizing, by controller, cabin cooling over traction battery cooling based upon HVAC load and evaporator error.

The method may further include the step of determining, by the controller, HVAC load based upon indicated HVAC blower speed and indicated ambient air temperature. In addition, the method may include the steps of (a) determining, by the controller, evaporator error by comparing indicated evaporator temperature to a target evaporator temperature and (b) determining, by the controller, chiller AC capacity as a function of evaporator error and HVAC load.

Still further, the method may include the step of monitoring, by a fourth device, refrigerant temperature between the chiller and the compressor. Still further, the method may include the step of monitoring, by a fifth device, refrigerant pressure between the chiller and the compressor.

In addition, the method may also include other steps such as the circulating of coolant between the traction battery and the chiller and the circulating of refrigerant between a compressor, a condenser and that chiller. Still further, the method may include the step of controlling the flow of the refrigerant through the chiller by means of an electronic expansion valve provided in the refrigerant circuit between the condenser and the chiller. Further, the method may include the step of controlling, by the controller, operation of the electronic expansion valve based upon (a) available chiller capacity, (b) coolant temperature upstream of the traction battery and (c) refrigerant temperature between the chiller and the compressor.

In addition, the method may include the step of determining, by the controller, a maximum electronic expansion valve opening position as a function of the chiller AC capacity and AC compressor speed. Further, the method may include determining an electronic expansion valve position by summing an output of a coolant temperature proportional integral (PI) controller with an output of a superheat PI controller. A final electronic expansion valve position is then determined as a function of the maximum electronic expansion valve opening position and the electronic expansion valve opening target position.

In the following description, there are shown and described several preferred embodiments of the cooling system and method of controlling traction battery cooling while limiting temperature swings of the conditioned air being discharged into the cabin of an electrified motor vehicle. As it should be realized, the cooling system and method are capable of other, different embodiments and their several details are capable of modification in various, obvious aspects all without departing from the cooling system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cooling system and related method and together with the description serve to explain certain principles thereof. In the drawing figures.

Reference will now be made in detail to the present preferred embodiments of the traction battery cooling system, examples of which are illustrated in the accompanying drawing figures.

DETAILED DESCRIPTION

Figure 1:
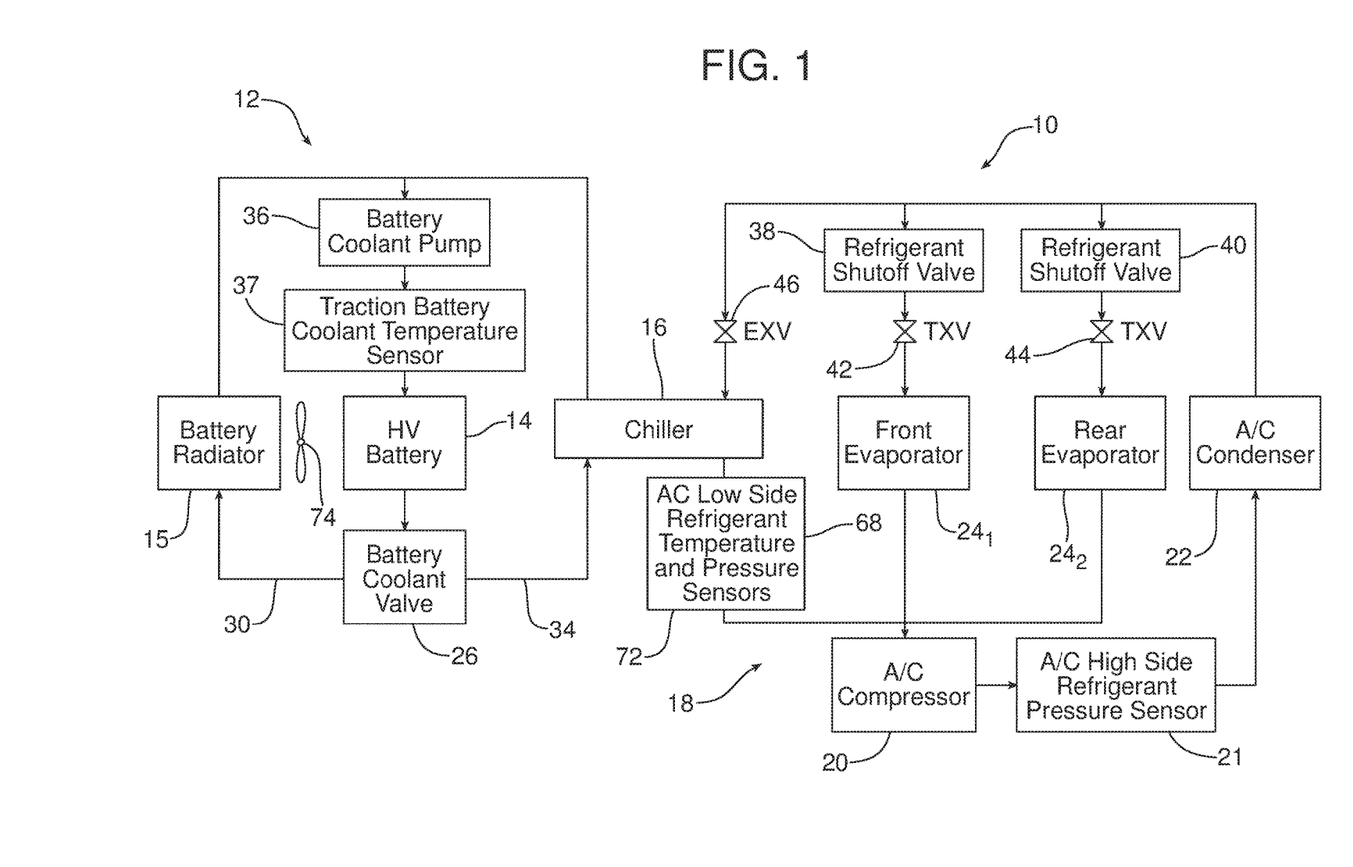
FIG. 1 is a schematic block diagram of the traction battery cooling system.

Reference is now made to FIG. 1 schematically illustrating the traction battery cooling system 10 adapted for an electrified motor vehicle such as a hybrid electric vehicle or an electric vehicle. The cooling system 10 includes a coolant circuit 12 for circulating a coolant between a traction battery 14 and either a battery radiator 15 and/or a refrigerant-to-coolant chiller 16 for heat exchange (there is no mixing of refrigerant and coolant). The coolant may be a conventional coolant mixture, such as water and ethylene glycol.

The traction battery cooling system 10 also includes a refrigerant circuit generally designated by reference numeral 18. The refrigerant circuit 18 circulates a refrigerant between an A/C compressor 20, a condenser 22 and either or both of the two evaporators $24_1$ or $24_2$ and/or the chiller 16. The refrigerant may be a conventional refrigerant, such as R134a or R1234yf.

As further illustrated in FIG. 1, the cooling system 10 also includes a plurality of flow control valves in the coolant circuit 12 and the refrigerant circuit 18. More specifically, the traction battery coolant valve 26 is provided in the coolant circuit 12 downstream from the traction battery 14 where it is adjusted to direct coolant flow through either a first loop 30 between the traction battery 14 and the traction battery radiator 15 or a second loop 34 between the traction battery and the chiller 16. A traction battery coolant pump 36 functions to circulate the coolant through either or both loops depending upon the position of the traction battery coolant valve 26. A sensor 37 monitors the temperature of that coolant upstream from the traction battery 14.

The plurality of flow control valves also includes the front evaporator shutoff valve 38 between the condenser 22 and the front evaporator $24_1$ and the rear evaporator shutoff valve 40 between the condenser and the rear evaporator $24_2$. In addition, a first expansion device 42 is provided in the refrigerant circuit 18 between the front evaporator shutoff valve 38 and the front evaporator $24_1$. Similarly, a second expansion device 44 is provided in the refrigerant circuit 18 between the rear evaporator shutoff valve 40 and the rear evaporator $24_2$. Here, it should be appreciated that the evaporator shutoff valve 38 and the first expansion device 42 could be combined into one device, if desired, to minimize possible refrigerant leak paths. The shutoff valve 40 and second expansion device 44 could be similarly combined. Still further, an electronic expansion valve 46 is provided in the refrigerant circuit 18 between the condenser 22 and the chiller 16. The electronic expansion valve 46 has full range of motion from zero flow to open full flow.

Figure 2:
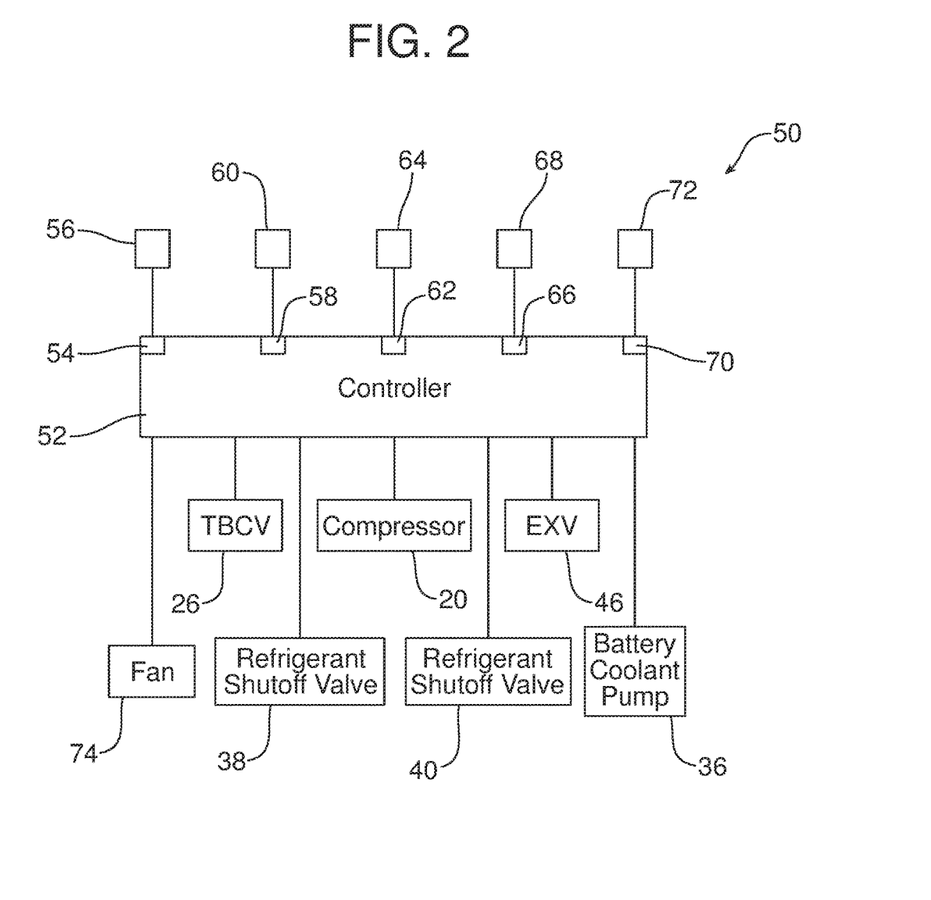
FIG. 2 is a schematic block diagram of the control system for the cooling system illustrated in FIG. 1.

As illustrated in FIG. 2, the cooling system 10 also includes a control system generally designated by reference numeral 50. As shown, the control system 50 includes a controller 52. The controller 52 is a computing device such as a dedicated microprocessor or electronic control unit (ECU) operating in accordance with instructions provided by control software. Such a controller 52 may comprise one or more processors, one or more memories and one or more network interfaces that all communicate with each other over a communication bus.

The controller 52 is configured to (a) control operation of the plurality of flow control valves including, but not necessarily limited to the traction battery cooling valve 26 and the electronic expansion valve 46, and (b) may prioritize cabin cooling over traction battery cooling during normal motor vehicle operation. Toward this end, the controller 52 is configured to include a first data input 54 that is connected to a sensor or other device 56, such as another controller, providing data respecting the ambient air temperature. The controller 52 is also configured to include a second data input 58 connected to a sensor or other device 60, such as another controller, for providing data input for HVAC blower speed.

As further shown, the controller 52 is also configured to include a third data input 62 that is connected to a sensor or device 64, such as another controller, providing data respecting temperature of the evaporators $24_1$, $24_2$ (one sensor or device 64 per cabin evaporator). The controller 52 is also configured to include a fourth data input 66 that is connected to a sensor or device 68, such as another controller, providing data respecting the temperature of the refrigerant. In addition, the controller 52 is configured to include a fifth data input 70 that is connected to a sensor or device 72, such as another controller, providing data respecting the pressure of the refrigerant in the refrigerant circuit 18. The sensors or devices 68, 72 are located between the outlet of the chiller 16 and the inlet of the compressor 20.

While not illustrated in FIG. 2, it should be appreciated that the controller 52 may include additional data inputs connected to other sensors or devices, including other controllers, that provide data input respecting other system operating parameters including, but not necessarily limited to, battery temperature, battery coolant temperature (note sensor 37 in FIG. 1), refrigerant pressure (note sensor 21 in FIG. 1) and cabin cooling requests from the HVAC system of the motor vehicle. Controller 52 is generally configured to provide the necessary cooling for the traction battery 14 while utilizing a minimum amount of motor vehicle energy. Toward this end, the controller 52 is configured to operate in three different battery cooling modes. In the first mode, which consumes the least amount of motor vehicle energy, the traction battery coolant valve 26 is positioned to circulate the coolant in the coolant circuit 12 through the first loop 30 between the traction battery 14 and the battery radiator 15. Ambient air forced through the radiator 15 during motor vehicle movement functions to the cool the coolant which is then circulated by the pump 36 back through the battery 14 in order to maintain a desired operating temperature for the traction battery. In the event the temperature of the traction battery 14 rises to a certain predetermined temperature, the controller 52 operates in a second cooling mode wherein the fan 74 is activated to force cooling air through the radiator thereby providing additional cooling to the coolant and the traction battery 14 through which the coolant is circulated.

In the event the temperature of the traction battery 14 reaches a predetermined, higher temperature when operating in the second cooling mode, the controller 52 initiates a third cooling mode by repositioning the traction battery coolant valve 26 to direct some or all of the coolant through the second loop 34 so that the selected portion of the coolant flow is pushed by the pump 36 to circulate between the battery 14 and the chiller 16. It is in this mode that the controller 52 is configured to prioritize cabin cooling over traction battery cooling during normal motor vehicle operation.

Toward this end, a method of controlling traction battery cooling while limiting temperature swings of the conditioned air being discharged into the cabin of an electrified motor vehicle is provided. That method includes the steps of: (a) monitoring, by a first device 56, ambient air temperature, (b) monitoring, by a second device 60, HVAC blower speed, (c) monitoring, by a third device 64, evaporator temperature and (d) prioritizing, by the controller 52 cabin cooling over traction battery cooling based upon HVAC load and evaporator error.

Figure 3:
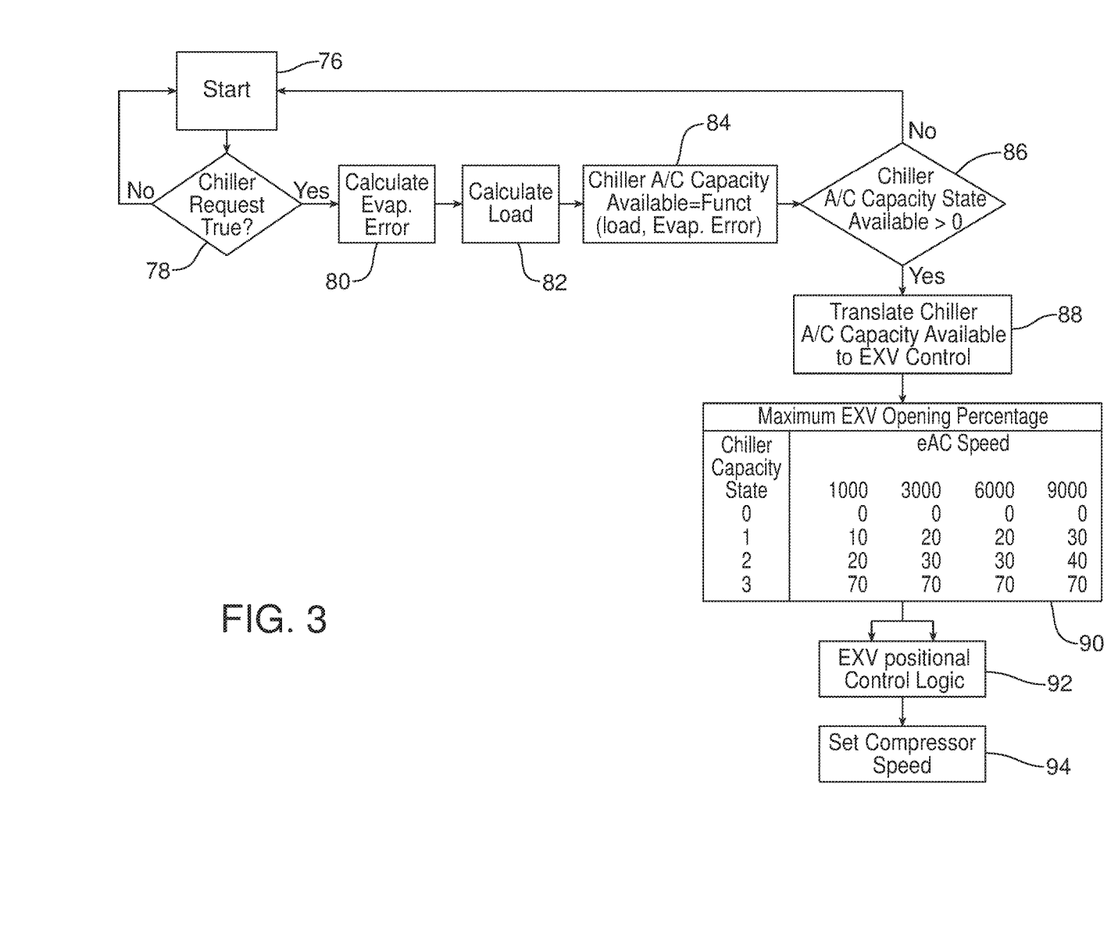
FIG. 3 is a control logic flow diagram depicting operation of one possible embodiment of the cooling system.
Figure 4:
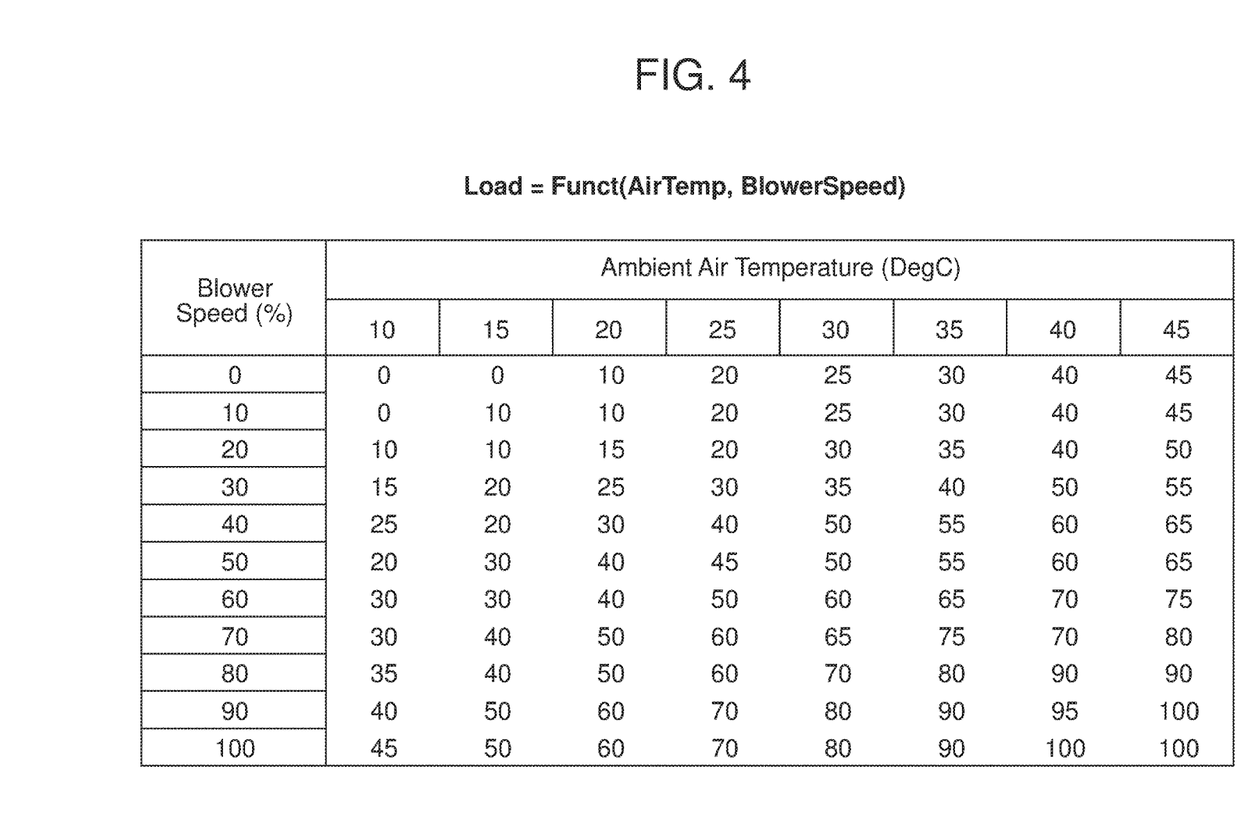
FIG. 4 is a table indicating HVAC load for one possible embodiment of the cooling system.

More specifically, as illustrated in FIG. 3, upon initiating the third cooling mode (note Box 76), a chiller request 78 is generated. In response, the controller 52 determines/calculates evaporator error 80 and HVAC load 82. As illustrated in FIG. 4, HVAC load is a function of ambient air temperature and HVAC blower speed and, therefore, is determined by the controller 52 based upon data provided by the sensors or devices 56, 60 at the respective data inputs 54, 58. In the embodiment of the system 10 illustrated in FIG. 4, an ambient temperature of 25 degrees C. and a blower speed percentage of 60% produces an HVAC load of 50.

Evaporator error is determined by comparing the actual evaporator temperature as indicated by the sensor or device 64 at the third data input 62 to a target evaporator temperature as stored in the controller 52.

Figure 5:
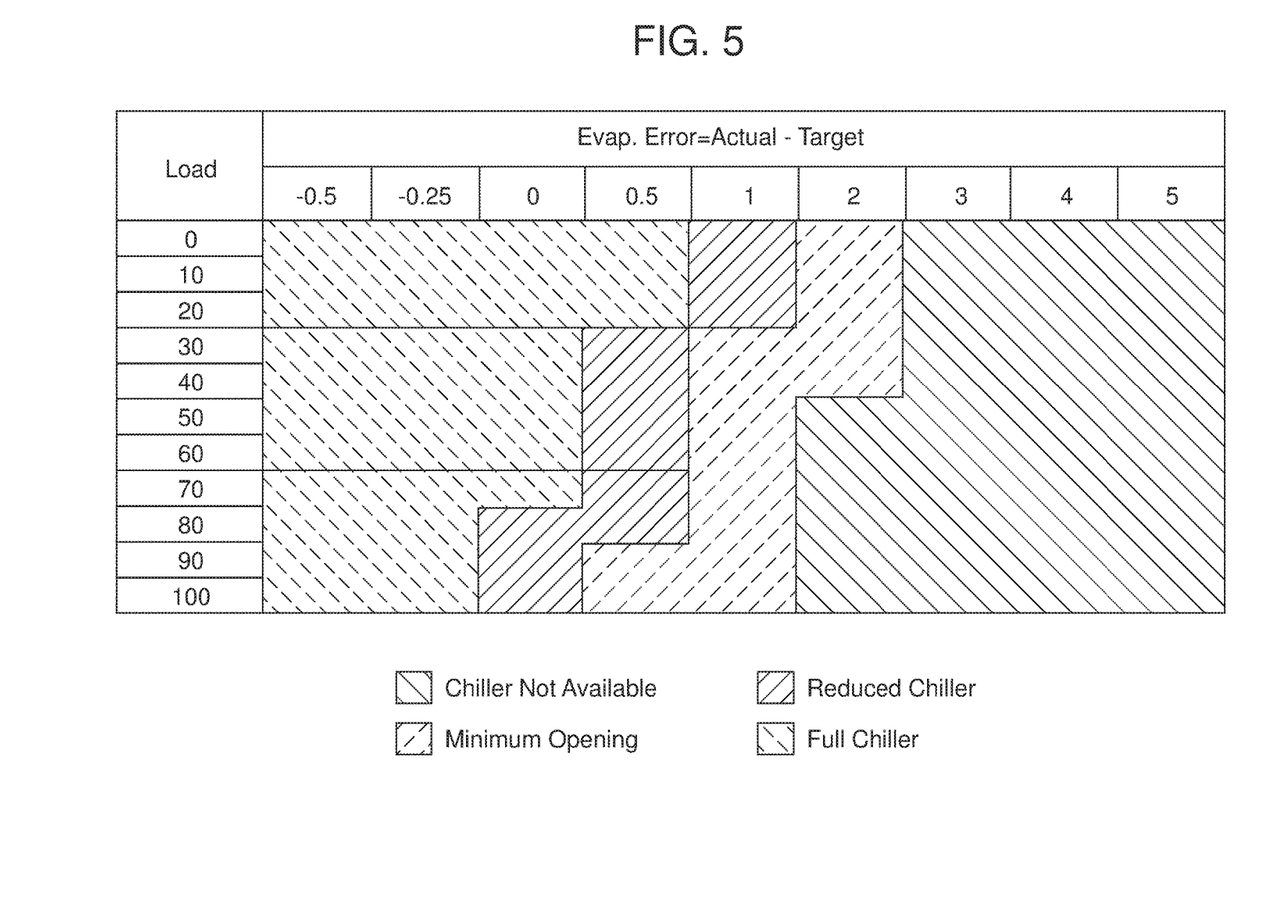
FIG. 5 is a table illustrating four different levels of chiller operation management for one possible embodiment of the cooling system based upon load and evaporator error.

As illustrated in FIG. 3 the controller 52 then determines the chiller A/C capacity available for traction battery cooling (note Box 84) as a function of the determined evaporator error and HVAC load. FIG. 5 illustrates a function table for one particular embodiment of the cooling system 10. In this embodiment, an evaporator error of 3, 4 or 5 indicates that the chiller 16 is not available for any level of traction battery cooling (Chiller Capacity State 0). In contrast, an evaporator error of 2 and a load of 30 indicates that the chiller 16 is available at a minimum opening for battery cooling (Chiller Capacity State 1). Still further, an evaporator error of 0.5 and a load of 60 indicates that the chiller is available for reduced chiller cooling of the traction battery 14 (Chiller Capacity State 2). Finally, for example, an evaporator error of 0 and a load of 50 indicates that a full level of the chiller 16 is available for traction battery cooling (Chiller Capacity State 3).

As illustrated in FIG. 3, if chiller A/C capacity is not available for cooling (Chiller Capacity State 0), the operating algorithm returns to start. In this situation, the battery thermal system will continue to cool via the battery radiator 15 (with or without operation of the fan 74) and continue to request the chiller 16. Once chiller capacity becomes available, the battery thermal system will transition to the chiller 16. In other words, there are times when the battery cooling mode may be requesting the chiller 16 but still running in the battery radiator loop 30. The actual algorithm to determine chiller availability may be a closed loop algorithm that will open the electronic expansion valve 46 based upon available capacity. The steps shown are merely exemplary of how the valve 46 will open in proportion to available chiller capacity.

In contrast, if evaporator chilling is available for the traction battery 14 the level of cooling or electronic expansion valve 46 opening target position is determined as a function of chiller capacity state and compressor speed, as shown in Box 90. Thus, for example, for a chiller capacity state of 1 and a compressor speed of 3000 rpm the electronic expansion valve 46 is opened 20%. For a chiller capacity state of 2 and a compressor speed of 6000 rpm the electronic expansion valve 46 is opened 30%. The target position is then passed to the electronic expansion valve controller which would assure that the electronic expansion valve 46 moves to the desired opening amount.

Figure 3A:
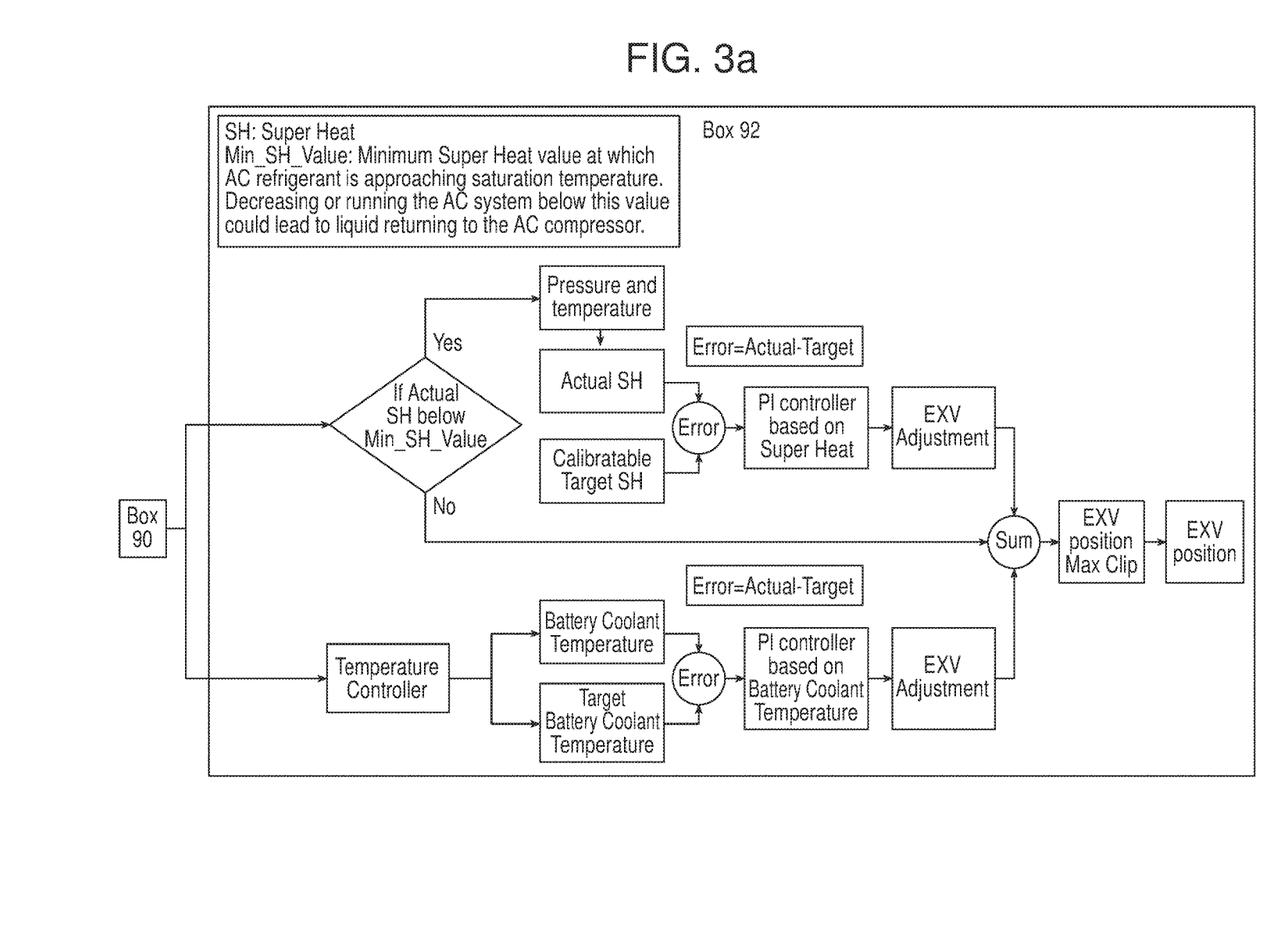
FIG. 3a is a detailed view of Box 92 of the control logic flow diagram depicted in FIG. 3.

Once the controller 52 determines the chiller capacity is fully available (Chiller Capacity State 3), the electronic expansion valve 46 position is determined by Box 92 (Note FIGS. 3 and 3a). Thus, the controller 52 runs a temperature and superheat control in parallel. Superheat is the temperature of a substance above the saturation temperature at constant pressure. The controller 52 implements a PI controller to control the coolant temperature into the battery based on a calibratable target coolant temperature. The electronic expansion valve 46 makes positional adjustments based on the error in these two temperatures. If the actual refrigerant superheat between the chiller 16 and the AC compressor 20 falls below a minimum superheat value then the controller 52 activates a superheat PI controller along with the temperature PI controller (see Box 92 in FIG. 3a). The refrigerant superheat controller makes electronic expansion valve 46 positional adjustments based on the actual superheat and a calibratable target superheat. These controls are always running in the controller 52, but chiller states 1 and 2 apply the electronic expansion valve 46 position max clip based on compressor speed, seen in Box 90, which limits the electronic expansion valve 46 opening position. The controller 52 also sets the speed of the AC compressor 20 as needed to provide the desired cooling function for both the motor vehicle cabin and the traction battery 14 (see Box 94).

In summary, numerous benefits and advantages are provided by the traction battery cooling system 10. The controller 52 operates the electronic expansion valve 46 to directly throttle the flow of refrigerant to the chiller 16. In order to accomplish this task, the controller 52 actively controls the electronic expansion valve 46 based upon refrigerant temperature and refrigerant pressure as indicated by the sensors or devices 68, 72 at the respective data inputs 66, 70 of the controller. As shown in FIG. 1, those sensors or devices 68, 72 are provided in the refrigerant circuit 18 at the chiller outlet in order to ensure that the refrigerant through the chiller is properly vaporizing. This is done to avoid the possibility of liquid refrigerant being sent to the A/C compressor 20 as that could lead to compressor failure.

As should be further appreciated from the above description, the controller 52 monitors the environmental conditions of the motor vehicle cabin to determine when to start the chiller 16 and how to manage the total A/C capacity thereafter. Thus, chiller capacity availability for traction battery cooling is a function of HVAC load. If the cabin is not cool or the capacity is at the limit for cooling of the cabin, the start of traction battery cooling via the chiller 16 is delayed. More specifically, the circulation of refrigerant to the chiller 16 may be delayed by the controller 52 until the HVAC load for the cabin has been stabilized and is below the total A/C capacity. In the meantime, the traction battery 14 is cooled in the first or second mode by the battery radiator 32.

Advantageously, the controller 52 has the ability to manage the flow of refrigerant to the chiller 16 at all times. This allows for traction battery cooling via the chiller 16 to be started smoothly and run continuously with minimal impact to the cabin. As a result, detrimental swings in the temperature of the conditioned air passing through the evaporators $24_1$, $24_2$ and later being discharged into the cabin are minimized. The system 10 and related method prioritize cabin cooling by delaying the chiller start and also provide a method to run at reduced chilling capacity to maintain cabin comfort under changing A/C capacity conditions. Only under extreme operating conditions where traction battery temperatures rise to predetermined critical levels does the controller 52 prioritize battery cooling over cabin cooling by first providing full chiller capacity to the chiller 16 for traction battery cooling and any remaining AC capacity to the cabin.

The foregoing has been presented for purposes of illustration and description. It is not intended to be exhaustive or to limit the embodiments to the precise form disclosed. Obvious modifications and variations are possible in light of the above teachings. For example, cabin temperature could be a system input to be monitored and used in controlling the cooling system 10. All such modifications and variations are within the scope of the appended claims when interpreted in accordance with the breadth to which they are fairly, legally and equitably entitled.

What is claimed:

1. A cooling system for an electrified motor vehicle, comprising:
   a coolant circuit circulating coolant between a traction battery and either a battery radiator or a chiller;
   a refrigerant circuit circulating refrigerant between a compressor, a condenser and either a first evaporator or said chiller;
   a plurality of flow control valves in said coolant circuit and said refrigerant circuit; and
   a control system including a controller configured to (a) control operation of said plurality of flow control valves and (b) prioritize cabin cooling over traction battery cooling based upon HVAC load and evaporator error.

2. The cooling system of claim 1, wherein said plurality of flow control valves includes an electronic expansion valve in said refrigerant circuit between said condenser and said chiller.

3. The cooling system of claim 2, wherein said controller is configured to include a first data input for ambient air temperature.

4. The cooling system of claim 3, wherein said controller is configured to include a second data input for HVAC blower speed.

5. The cooling system in claim 4, wherein said controller is configured to include a third data input for evaporator temperature.

6. The cooling system of claim 5, wherein said control system further includes an ambient temperature sensor and an evaporator temperature sensor.

7. The cooling system of claim 6, wherein said controller is configured to include a fourth data input for refrigerant temperature which is monitored in said refrigerant circuit between said chiller and said compressor.

8. The cooling system of claim 7, wherein said controller is further configured to include a fifth data input for refrigerant pressure which is monitored in said refrigerant circuit between said chiller and said compressor.

9. The cooling system of claim 8, wherein said control system further includes a refrigerant temperature sensor and a refrigerant pressure sensor in said refrigerant circuit between said chiller and said compressor.

10. The cooling system of claim 9, wherein said refrigerant circuit includes a second evaporator in parallel to said first evaporator.

11. A method of controlling traction battery cooling while limiting temperature swings of conditioned air discharged into a cabin of an electrified motor vehicle, comprising:
    monitoring, by a first device, ambient air temperature;
    monitoring, by a second device, HVAC blower speed;
    monitoring, by a third device, evaporator temperature; and
    prioritizing, by a controller, cabin cooling over traction battery cooling based upon HVAC load and evaporator error.

12. The method of claim 11, further including determining, by said controller, HVAC load based upon indicated HVAC blower speed and indicated ambient air temperature.

13. The method of claim 12, further including (a) determining, by said controller, evaporator error by comparing indicated evaporator temperature to a target evaporator temperature and (b) determining, by said controller, chiller AC capacity state as a function of evaporator error and HVAC load.

14. The method of claim 13, further including monitoring, by a fourth device, refrigerant temperature.

15. The method of claim 14, further including monitoring, by a fifth device, refrigerant pressure.

16. The method of claim 15, including circulating coolant between said traction battery and a chiller and circulating refrigerant between a compressor, a condenser and said chiller.

17. The method of claim 16, including controlling flow of said refrigerant through said chiller by means of an electronic expansion valve in a refrigerant circuit between said condenser and said chiller.

18. The method of claim 17, including controlling, by said controller, operation of said electronic expansion valve based upon (a) available chiller capacity, (b) coolant temperature upstream of the traction battery and (c) refrigerant superheat temperature between the chiller and the compressor.

19. The method of claim 13, including determining, by said controller, a maximum electronic expansion valve opening position as a function of said chiller AC capacity state and AC compressor speed.

20. The method of claim 19, including determining, by said controller, an electronic expansion valve opening target position by summing an output of a coolant temperature PI controller with an output of a superheat PI controller wherein a final electronic expansion valve opening position is determined as a function of said maximum electronic expansion valve opening position and said electronic expansion valve opening target position.

\* \* \* \* \*